(12) United States Patent
Cronholm

(10) Patent No.: US 9,937,844 B2
(45) Date of Patent: Apr. 10, 2018

(54) METHOD FOR TIPPING A LOAD AND A TIPPING DEVICE

(75) Inventor: Kent Cronholm, Karlskrona (SE)

(73) Assignee: Volvo Construction Equipment AB, Eskilstuna (SE)

( * ) Notice: Subject to any disclaimer, the term of this patent is extended or adjusted under 35 U.S.C. 154(b) by 104 days.

(21) Appl. No.: 14/386,807

(22) PCT Filed: Apr. 11, 2012

(86) PCT No.: PCT/SE2012/000051
§ 371 (c)(1),
(2), (4) Date: Sep. 21, 2014

(87) PCT Pub. No.: WO2013/154471
PCT Pub. Date: Oct. 17, 2013

(65) Prior Publication Data
US 2015/0051798 A1    Feb. 19, 2015

(51) Int. Cl.
*G06F 7/70* (2006.01)
*G06G 7/00* (2006.01)
*B60P 1/16* (2006.01)
*B60P 1/28* (2006.01)

(52) U.S. Cl.
CPC ............... *B60P 1/162* (2013.01); *B60P 1/283* (2013.01)

(58) Field of Classification Search
USPC ...................................................... 701/1, 50
See application file for complete search history.

(56) References Cited

U.S. PATENT DOCUMENTS

| 4,123,907 A | 11/1978 | Bianchetta et al. |
| 5,736,939 A * | 4/1998 | Corcoran ................ B60T 8/172 |
| | | 340/442 |
| 5,742,228 A * | 4/1998 | Levy ........................ B60P 1/28 |
| | | 180/282 |

(Continued)

FOREIGN PATENT DOCUMENTS

| EP | 0223384 A1 | 5/1987 |
| EP | 1231387 A2 | 8/2002 |

OTHER PUBLICATIONS

International Search Report dated (Oct. 31, 2012) for corresponding International Application PCT/SE2012/000051.

*Primary Examiner* — Bhavesh V Amin
(74) *Attorney, Agent, or Firm* — WRB-IP LLP

(57) ABSTRACT

A method for tipping a load by a working machine is provided. The working machine includes a load carrier and at least one lift cylinder adapted to raise the load carrier for tipping the load. The method includes obtaining a measure of the inclination angle of the working machine, where the inclination of the working machine is such that the rear end of the working machine is higher than the front end thereof, allowing a first maximal tipping pressure to the lift cylinder for raising the load carrier when the inclination angle is smaller than a predefined inclination angle, and allowing a second maximal tipping pressure to the lift cylinder for raising the load carrier when the inclination angle is greater than the predefined inclination angle, and where the second maximal tipping pressure exceeds the first maximal tipping pressure. A tipping device, a working machine comprising such a tipping device, a computer program and a computer program product are also provided.

22 Claims, 5 Drawing Sheets

(56) References Cited

U.S. PATENT DOCUMENTS

| | | | | |
|---|---|---|---|---|
| 6,108,948 A * | 8/2000 | Tozawa | ............... | E02F 3/435 |
| | | | | 172/2 |
| 6,260,642 B1 * | 7/2001 | Yamamoto | ............ | B62D 11/08 |
| | | | | 180/6.7 |
| 7,810,887 B2 * | 10/2010 | Hjerth | ................ | B60P 1/045 |
| | | | | 298/17 S |
| 8,267,480 B2 * | 9/2012 | Kvist | .................. | B60P 1/283 |
| | | | | 298/19 R |
| 9,120,416 B2 * | 9/2015 | Minoshima | ............ | B60P 1/283 |
| 2008/0208416 A1 * | 8/2008 | Yuet | ....................... | B60T 7/12 |
| | | | | 701/50 |
| 2010/0084908 A1 * | 4/2010 | Montocchio | ............ | B60P 1/283 |
| | | | | 298/22 C |
| 2011/0283693 A1 * | 11/2011 | Ramler | ............ | F15B 11/024 |
| | | | | 60/461 |
| 2014/0222299 A1 * | 8/2014 | Stander | ................ | B60P 1/045 |
| | | | | 701/50 |
| 2014/0336883 A1 * | 11/2014 | Thompson | ............ | B60P 1/045 |
| | | | | 701/50 |
| 2015/0127212 A1 * | 5/2015 | Chacon | .............. | B60R 21/013 |
| | | | | 701/32.4 |

\* cited by examiner

METHOD FOR TIPPING A LOAD AND A TIPPING DEVICE

BACKGROUND AND SUMMARY

The present invention relates to a method for tipping a load by a working machine and a tipping device adapted for a working machine. The method and device is suitable for heavy vehicles, such as trucks and construction vehicles.

Heavy vehicles, especially trucks, articulated haulers and other construction equipment vehicles are often provided with a tipping device adapted to unload goods transported by the load carrier of the vehicle. Such a load carrier may be e.g. a platform for carrying sand, stones etc., a concrete mixer, a concrete hopper or a vessel for carrying dry, powdery products such as flour, grain etc. The goods are unloaded by tipping the load carrier by one or more load cylinders. The pressure to the load cylinders is provided by a hydraulic oil pressure system on the vehicle. In order to avoid overloading the hydraulic system, a maximal tipping pressure is predefined by the control unit of the hydraulic system. This ensures that the vehicle and thus the tipping device is not overloaded.

This maximal tipping pressure normally has an allowed additional positive pressure such that a somewhat higher tipping pressure than the nominal tipping pressure is allowed. This additional pressure is provided in order to ensure that the nominal load can always be unloaded, regardless of other parameters influencing the load pressure. Such parameters may be e.g. the temperature of the hydraulic oil, the distribution of the load on the load carrier, the altitude of the vehicle and irregularities of the ground. In this way, the driver of the vehicle can be sure that he will always be able to unload. However, the operator may also use this additional pressure margin on a regular basis, constantly overloading the vehicle. This will cause excessive wear of the hydraulic system and the vehicle which may lead to unnecessary repairs of the vehicle and may also cause incorrect warranty demands.

Different solutions to this problem are known. One way is to minimize the allowed additional pressure margin such that only the nominal load can be tipped, regardless of the outer circumstances. Another way is to monitor and save tipping parameters exceeding predefined values in order to be able to determine if an excessive load has been used. This will however not prevent the overload.

There is thus a need for an improved tipping method and an improved tipping device.

It is desirable to provide an improved method for tipping a load by a working machine. It is also desirable to provide an improved tipping device for a working machine.

In a method for tipping a load by a working machine according to an aspect of the invention, where the working machine comprises a load carrier and at least one lift cylinder adapted to raise the load carrier for tipping the load, the steps of obtaining a measure for the inclination angle of the working machine, where the inclination of the working machine is such that the rear end of the working machine is higher than the front end thereof, allowing a first maximal tipping pressure to the lift cylinder for raising the load carrier when the inclination angle is less than a predefined inclination angle, and allowing a second maximal tipping pressure to the lift cylinder for raising the load carrier when the inclination angle is greater than the predefined inclination angle, where the second maximal tipping pressure exceeds the first maximal tipping pressure are comprised.

By this first embodiment of the method for tipping a load by a working machine according to an aspect of the invention, a method where the inclination angle of the working machine is used to control the tipping pressure is provided. The tipping pressure can thus be set to a first tipping pressure value when the inclination angle of the working machine is less than a predefined inclination value, and to a second tipping pressure value when the inclination angle of the vehicle exceeds the predefined inclination value. The predefined inclination angle value may be pre-set by the manufacturer or may be set depending on the use of the working machine or may be set depending on the marked. The predefined inclination angle is preferably such that the first tipping pressure value is used when the working machine is substantially horizontal and when the inclination of the working machine is relatively small. In one example, the predefined inclination angle is less than eight degrees, and preferably less than four degrees.

In an advantageous development of the inventive method, the second maximal tipping pressure is a function of the inclination angle. In this way, the tipping pressure can be adapted to the actual inclination of the working machine. In this way, a temporary high tipping pressure can be allowed which is adapted to the actual tipping conditions. The second tipping pressure can also be limited by a third, maximal tipping pressure value which corresponds to the maximal allowed pressure of the hydraulic system or the working machine. This will secure that the tipping pressure of the working machine never exceeds a value where the hydraulic system will break down or where parts will be damaged or cause hazardous situations due to temporary overload.

The inclination angle is either measured directly with an electronic inclination sensor or an inclinometer, or may be estimated by measuring the load distribution of the load. The load distribution may be measured either by measuring the load on the front axle and the rear axle, axles or bogie by using axle load sensors or by measuring the load at the front and at the rear of the load carrier by using load sensors mounted on the load carrier. The measured load values are compared with stored values regarding the nominal load distribution for the work machine. In this way, the actual load distribution can give an estimation of the inclination angle for the work machine.

In an advantageous development of the inventive method, the second tipping pressure is displayed on a display in the working machine. Preferably, the display is positioned in the instrument cluster and may be integrated in the instrument cluster and may be pan of the regular driver information system of the working machine. By showing the actual second pressure to the driver, the driver will see the available tipping pressure and may, by experience, assess if the available tipping pressure will suffice for the tipping to be done. The second tipping pressure may also be stored in a memory comprising a table such that the used tipping pressures can be monitored at a later stage. The tipping pressure may also be stored together with the inclination angle.

In a tipping device for a working machine, the working machine comprising a load carrier and at least one lift cylinder adapted to raise the load carrier, the object of the invention is achieved in that the tipping device comprises a means for adjusting the maximal allowed tipping pressure to the lift cylinder based on the inclination of the working machine.

By this first embodiment of the inventive tipping device, the tipping pressure of the tipping device is adapted to the inclination of the working machine. In this way, it is possible to control the tipping pressure of the working machine such that a constant overload of the tipping device is avoided, due to an allowed additional pressure to the tipping pressure. By controlling the tipping pressure in dependence of the inclination angle of the working machine, it can be ensured that the tipping device and thus the working machine is not overloaded.

In an advantageous development of the tipping device, the tipping device is adapted to operate with a first maximal tipping pressure when the inclination angle is less than a predefined inclination angle, and with a second maximal tipping pressure when the inclination angle is greater than the predefined inclination angle, and where the second maximal tipping pressure exceeds the first maximal tipping pressure. In this way, the tipping pressure can be controlled in dependency of the inclination angle of the working machine.

In an advantageous development of the inventive tipping device, the tipping pressure is a function of the inclination angle of the working machine. In this way, the tipping pressure can be controlled in a more precise way.

In an advantageous development of the inventive tipping device, the tipping pressure is limited to a third, maximal allowed tipping pressure, which corresponds to the maximal allowed tipping pressure of the hydraulic system. In this way, it is ensured that the hydraulic system or the working machine is not overloaded, regardless of the inclination angle of the working machine.

In an advantageous development of the inventive tipping device, the means for adjusting the tipping pressure comprises an inclinometer connected to a variable pressure valve with a lever, such that the variable pressure valve adjusts the tipping pressure in dependency of the inclinometer. In this way, the tipping pressure can be controlled in dependency of the inclination of the working machine in an easy and reliable way.

In an advantageous development of the inventive tipping device, the means for adjusting the tipping pressure comprises an electronic inclination sensor that inputs the inclination angle to a control unit. The control unit adjusts the tipping pressure in dependency of the measured inclination signal by sending a signal to an electric variable pressure valve. In this way, the tipping pressure can be controlled in a more refined way.

In an advantageous development of the inventive tipping device, the means for adjusting the tipping pressure comprises load sensing means arranged on a front axle and a rear axle, axles or bogie of the work machine. The load sensing means are used to measure the load distribution between the front and the rear of the work machine. Since the nominal load distribution for the work machine is known and is stored in a memory, a deviation in the load distribution can be used to estimate an inclination angle of the work machine. The control unit adjusts the tipping pressure in dependency of the estimated inclination angle by sending a signal to an electric variable pressure valve. In this way, the tipping pressure can be controlled in a more refined way.

The inclination angle can also be estimated by measuring the load distribution of the load in the load carrier. The load distribution is measured by measuring the load at the front and at the rear of the load carrier by using load sensors mounted on the load carrier. The measured load values are compared with stored values regarding the nominal load distribution for the load carrier. In this way, the actual load distribution can give an estimation of the inclination angle for the work machine.

BRIEF DESCRIPTION OF DRAWINGS

The invention will be described in greater detail in the following, with reference to the attached drawings, in which FIG. 3a shows a schematic tipping device on a horizontal ground.

DETAILED DESCRIPTION

The embodiments of the invention with further developments described in the following are to be regarded only as examples and are in no way to limit the scope of the protection provided by the claims.

Figure 1:
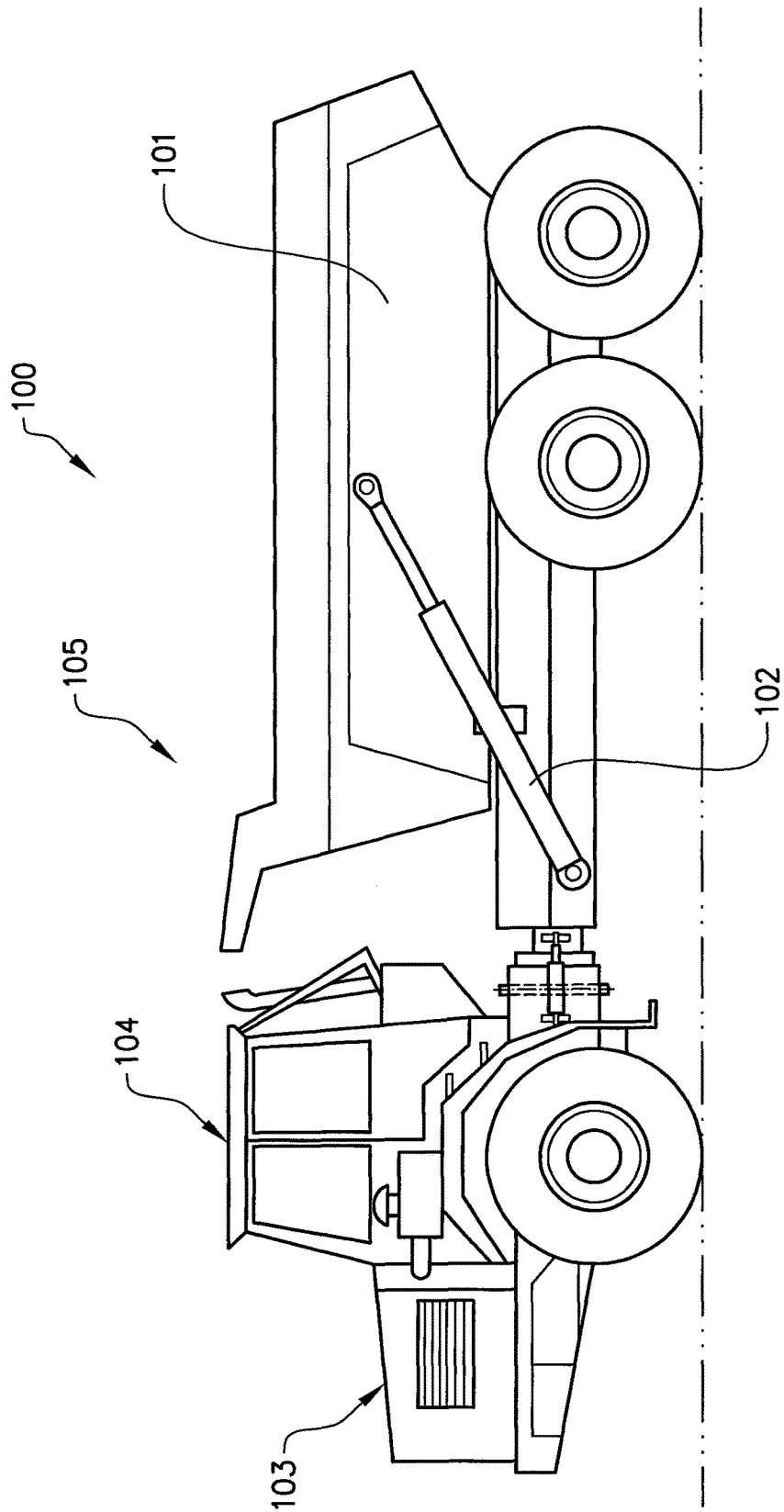
FIG. 1 shows a side view of an articulated hauler comprising a tipping device.

FIG. 1 is an illustration of a working machine 100 in the form of an articulated hauler. The articulated hauler comprises a load body 101 adapted to hold the goods that are to be transported. The load body is in the shown example raised at the front end by two hydraulic tipping cylinders 102 positioned one on each side of the load body. By raising the front end of the load body, the goods on the load body is unloaded by tipping the goods of the load body. The goods loaded on an articulated hauler used on a construction site may e.g. be sand, earth, gravel, stones or rocks. However, any product that may be handled in bulk and tipped off can be transported by the articulated hauler.

The hydraulic lift cylinders are powered by a main hydraulic pump comprised in the hydraulic system of the working machine. The articulated hauler further comprises an engine compartment 103 having an engine and an operator cab 104. The working vehicle further comprises an inventive tipping device 105 adapted to adapt the tipping pressure to the inclination of the vehicle. The tipping device comprises a load carrier, at least one hydraulic lift cylinder and a means for adjusting the maximal allowed tipping pressure 10.

An articulated hauler is used as an example of a working machine comprising a tipping device according to the invention in this description. However, other types of vehicles adapted to unload the carried goods by tipping may be used with the inventive tipping device. Such vehicles may be different trucks, construction vehicles or agricultural vehicles, including tipping wagons.

In FIG. 1, the working machine is shown on a substantially horizontal ground. This working position is the position for which the working machine is primarily designed for, and for which the load values, such as the tipping pressure, for the working machine are based. Since the working machine will be used also on uneven grounds, it is common to allow a somewhat higher tipping pressure to ensure that the load body can be raised also when the rear of the working machine is higher than the front of the working machine and the load body is loaded with the nominal load. This higher tipping pressure can be used when tipping the load body on an inclination, but also to tip a higher load than the nominal load on a horizontal ground, which means that it is possible to overload the working machine constantly when the working machine is used on horizontal ground. This will induce excessive wear which in turn will require more maintenance.

In FIG. 3a, a schematic tipping device on a horizontal ground is shown. The tipping force FA is adapted to be able to lift the load body with the nominal load. The nominal load is considered to be evenly distributed over the load body such that the load centre is approximately in the middle of the load body, with a distance x from the rear axis of rotation around which the load body will rotate during tipping.

Figure 3B:
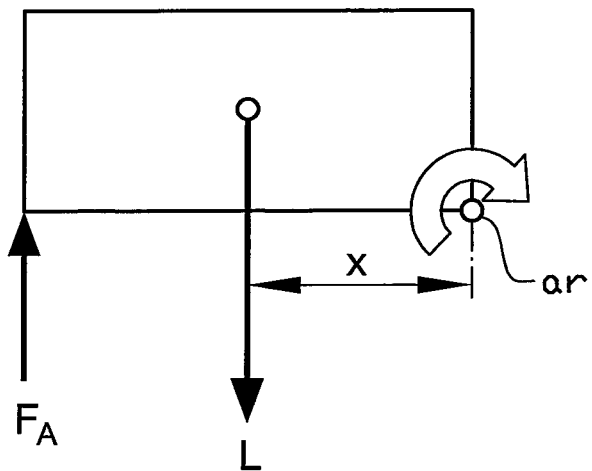
FIG. 3b shows a schematic tipping device on an inclined ground, FIG. 4a schematically shows a means for adjusting the tipping pressure according to a first embodiment, FIG. 4b schematically shows a means for adjusting the tipping pressure according to a second embodiment, FIG. 4c schematically shows a means for adjusting the tipping pressure according to a third embodiment.
Figure 3B:
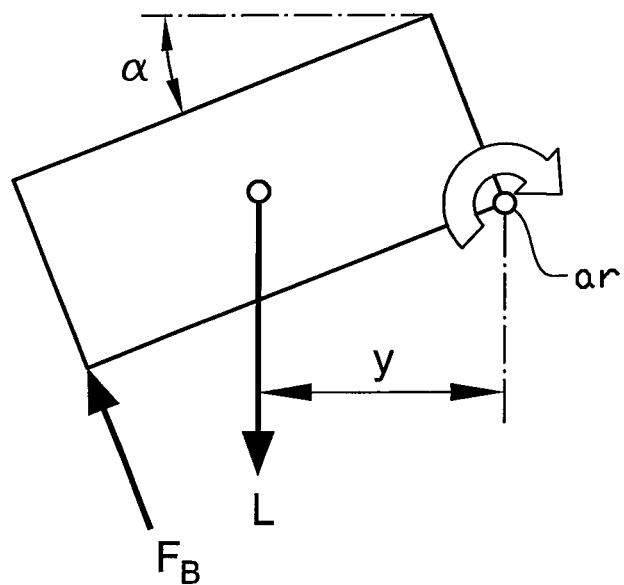

In FIG. 3b, a schematic tipping device on an inclined ground is shown. The tipping force FB is here adapted to be able to lift the load body with the nominal load. The nominal load is also here considered to be evenly distributed over the load body and the load centre is approximately in the middle of the load body, but due to the inclination, the distance y between the vertical vector of the load and the rear axis of rotation at is larger than x. This in turn requires the force FB to be greater than FA in order to be able to raise the load body.

Figure 2:
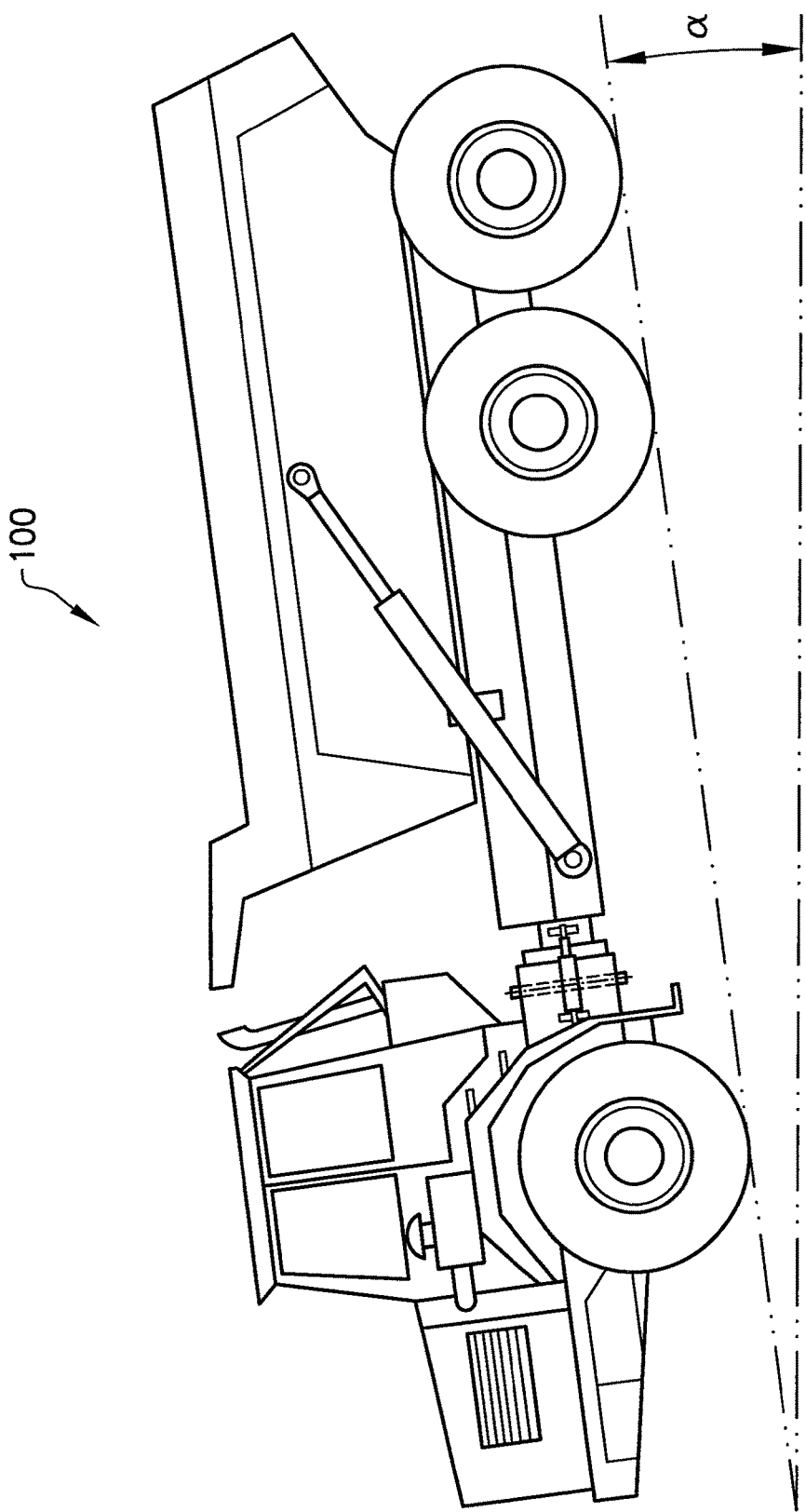
FIG. 2 shows the articulated hauler on an inclined ground.

In FIG. 2, the working machine is shown on an inclined ground, with the rear of the working machine being higher than the front of the working machine. The inclination angle is a. To be able to raise the load body loaded with a nominal load, a tipping pressure higher than the tipping pressure for a working machine standing on flat ground is required. The inclination of the working machine is thus obtained and used to control the tipping pressure.

Figure 4A:
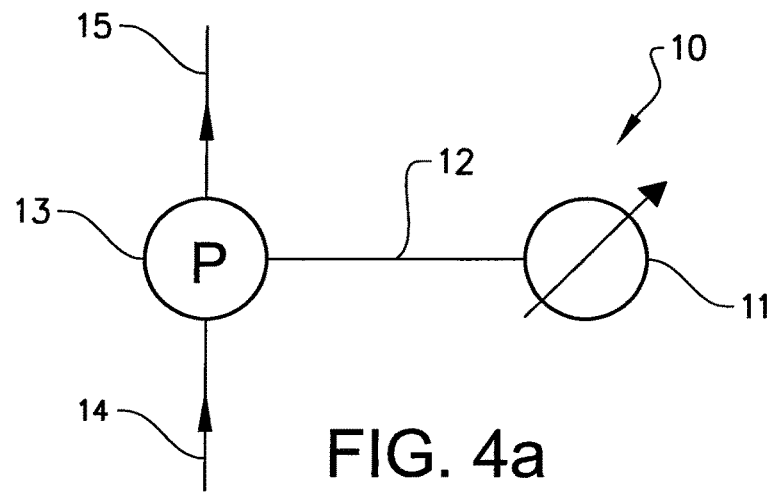

In a first embodiment, schematically shown in FIG. 4a, the means for adjusting the tipping pressure 10 comprises an inclinometer 11, preferably attached to the rear of the working machine, such that the inclinometer obtains the inclination of the rear of the working machine. The inclinometer is connected to a variable pressure valve 13 with a lever 12 or the like, such that the variable pressure valve adjusts the tipping pressure in dependency of the inclinometer. The variable pressure valve 13 adjusts the incoming pressure in pressure conduit 14 to a tipping pressure in pressure conduit 15. In this way, the tipping pressure will be higher when the working machine is inclined more and lower when the working machine is inclined less. The relation between the inclinometer and the variable pressure valve may be linear or nonlinear, depending on the requirements for the system. The inclinometer normally gives a continuous inclination value, but it would also be possible to use a step inclinometer which gives one output when the inclination angle is below a predefined angle and which changes output when the inclination angle is above the predefined angle. The step inclinometer controls a valve such that an additional tipping pressure is added to the nominal tipping pressure when the inclination angle is above the predefined angle. By using mechanical means to control the tipping pressure, an easy and robust tipping pressure control is provided.

Figure 4B:
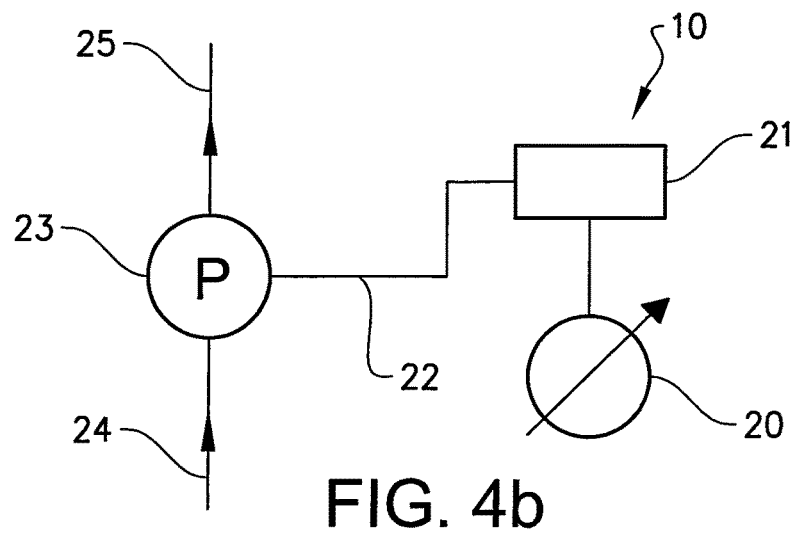

In a second embodiment, schematically shown in FIG. 4b, the means for adjusting the tipping pressure 10 comprises an electronic inclination sensor 20, preferably attached to the rear of the working machine. The inclination sensor may also be a sensor already used on the working machine, such that the inclination signal can be used also to control the tipping pressure. The inclination angle is input to a control unit 21, either a stand-alone control unit or a control unit already used in the electronic control system of the working machine. The control unit adjusts the tipping pressure in dependency of the measured inclination value by sending a desired pressure value to an electric variable pressure valve 23 through a circuit line 22. The electronic variable pressure valve 23 adjusts the incoming pressure in pressure conduit 24 to a tipping pressure in pressure conduit 25. In this way, the tipping pressure can be controlled in dependency of the inclination angle and also in dependency of other parameters, if required.

Figure 4C:
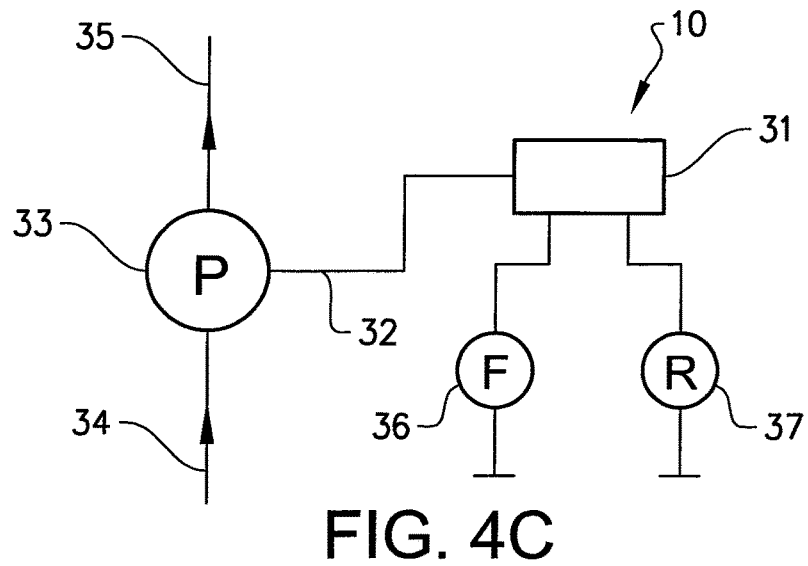

In a third embodiment, schematically shown in FIG. 4c, the means for adjusting the tipping pressure 10 comprises load sensing means 36, 37. The load sensor 36 is adapted to measure the load on a front axle of the work machine. If the work machine is equipped with two front axles, the load sensor can measure the load on both front axles. The load sensor 37 is adapted to measure the load on one or more rear axles or on a rear bogie. In this way, the load distribution of the work machine can be calculated. The load distribution value is then compared with a nominal load distribution value for the work machine. It is possible to store several load distribution values for the work machine corresponding to different load values, e.g. one value for an empty load carrier, one value for a half loaded load carrier and one value for a fully loaded load carrier. The load sensors may be additional load sensors mounted to the axles or may be sensors already used on the working machine for measuring the loads on each axle or each wheel.

The measured load values are received by a control unit 31, either a stand-alone control unit or a control unit already used in the electronic control system of the working machine. The control unit compares the measured load values with the stored load values and estimates an inclination angle for the work machine. If the estimated inclination angle is greater than the predefined inclination angle, the tipping pressure is adjusted in dependency of the estimated inclination value by sending a desired pressure value to an electric variable pressure valve 33 through a circuit line 32. The electronic variable pressure valve 33 adjusts the incoming pressure in pressure conduit 34 to a tipping pressure in pressure conduit 35. In this way, the tipping pressure can be controlled in dependency of the load distribution and also in dependency of other parameters, if required.

The load sensing means 36, 37 may also be mounted directly to the load carrier. The load sensor 36 is preferably mounted at the front of the load carrier, e.g. at a forward bearing surface, such that it can measure the load at the front of the load carrier. The load sensor 37 is preferably mounted at the rear of the load carrier, e.g. at the rear axis of rotation, such that it can measure load at the rear of the load carrier. In this way, the load distribution of the load carrier can be calculated. The load distribution value may then be compared with a nominal load distribution value for the load carrier.

When the measured load distribution differs from a nominal load distribution value by a predefined factor, the difference corresponds to an inclination angle. In this case, it is decided that the work machine is on an inclination and that the tipping pressure must be adjusted somewhat.

In a first example, the tipping pressure is a first maximal tipping pressure when the inclination angle is below a predefined angle and a second maximal tipping pressure when the inclination angle is above the predefined angle. In this way, it is ensured that the nominal tipping pressure is used when the working machine is substantially horizontal, avoiding overload, and that the load body can still be raised when the working machine is tipping in an inclined position.

In a second example, the tipping pressure is a function of the inclination angle. In this way, the tipping pressure can be adapted to the inclination angle in a more precise way, which may reduce the wear of the hydraulic system or the working machine. The pressure function may be linear or may be nonlinear and may be provided with an offset.

For both embodiments, there may be a third predefined, maximal tipping pressure which is a limit tipping pressure which may never be exceeded, regardless of the inclination angle. When the only two different discrete tipping pressures are used, the third tipping pressure corresponds to the second tipping pressure, but for a continuously variable tipping pressure, the third tipping pressure is the maximal tipping pressure allowed by the hydraulic system.

Figure 5:
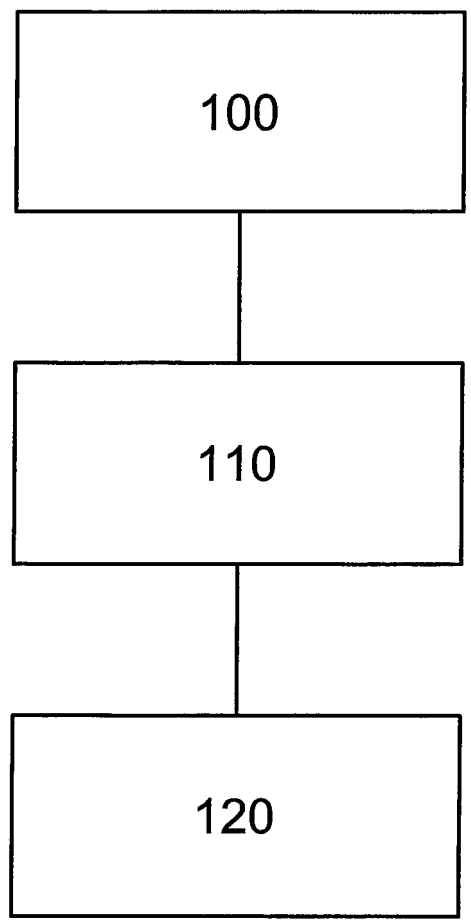
FIG. 5 shows a schematic flow chart of an inventive method according to the invention.

FIG. 5 shows a schematic flow chart of a method for tipping a load by a working machine.

In step 100, a measure for the inclination angle of the working machine is obtained, where the inclination of the working machine is such that the rear end of the working machine is higher than the front end thereof. The inclination measure is preferably a measure corresponding to the inclination angle of the working machine. The inclination angle may be measured by an in inclination sensor, preferably mounted on the rear part of the working machine. The inclination measure may also be obtained from the electronic control system of the working machine, if such a measure is available in the control system. It is also possible to use an inclinometer that is directly connected to an adjustable valve. The inclination angle may also be estimated by measuring the load distribution of the work machine or of the load carrier.

In step 110, a first maximal tipping pressure is allowed to the lift cylinder for raising the load carrier when the inclination angle is smaller than a predefined inclination angle. The maximal tipping pressure is not necessarily applied to the lift cylinder is all situations. It may be that the tipping system of the work machine is load sensing. In this case, the required tipping pressure is applied to the lift cylinder, up to the maximal tipping pressure allowed by the system. This will prevent overload of the tipping system when the working machine is inclined with an inclination angle below the predefined inclination angle. The predefined inclination angle is preferably less than eight degrees, and more preferably less than four degrees.

In step 120, a second maximal tipping pressure is allowed to the lift cylinder for raising the load carrier when the inclination angle is greater than the predefined inclination angle, where the second maximal tipping pressure exceeds the first maximal tipping pressure. Also in this case, when the actual inclination angle is greater than the predefined inclination angle, the second maximal tipping pressure is not necessarily applied to the tipping cylinder. With a load sensing tipping system, the applied tipping pressure will be the required tipping pressure, up to the second maximal tipping pressure. The advantage of allowing a higher tipping pressure when the working machine is inclined is that it will be possible, within certain limits, to tip a nominal load also when the working machine is inclined such that the rear of the working machine is higher than the front of the working machine. Since a higher tipping pressure is required for the same load when the working machine is inclined, the wear of the vehicle is minimized by allowing a tipping pressure that is higher than the first tipping pressure only when necessary.

This ensures that the operator does not constantly overload the working machine. The invention is not to be regarded as being limited to the embodiments described above, a number of additional variants and modifications being possible within the scope of the subsequent claims.

REFERENCE SIGNS

10 Means for adjusting the tipping pressure
11 Inclinometer
12 Lever
13 Variable pressure valve
14 Input pressure conduit
15 Output pressure conduit
20 Electronic inclination sensor
21 Control unit
22 Circuit line
23 Electric variable pressure valve
24 Input pressure conduit
25 Output pressure conduit
31 Control unit
32 Circuit line
33 Electric variable pressure valve
34 Input pressure conduit
35 Output pressure conduit
36 Front load sensor
37 Rear load sensor
100 Working machine
101 Load body
102 Hydraulic tipping cylinder
103 Engine compartment
104 Operator cab
105 Tipping device

The invention claimed is:

1. A method for tipping a load by a working machine, where the working machine comprises a load carrier and at least one lift cylinder adapted to raise the load carrier for tipping the load, comprising:
    obtaining a measure for the inclination angle of the working machine, where the inclination of the working machine is such that the rear end of the working machine is higher than the front end thereof,
    allowing a first maximal tipping pressure to the lift cylinder for raising the load carrier when the inclination angle is smaller than a predefined inclination angle, and
    allowing a second maximal tipping pressure to the lift cylinder for raising the load carrier when the inclination angle is greater than the predefined inclination angle, the second maximal tipping pressure exceeding the maximal tipping pressure.

2. Method according to claim 1, wherein the inclination angle is estimated by measuring the load distribution of the load in the load carrier.

3. Method according to claim 2, wherein the load distribution is measured by measuring the load on a front axle and a rear axle of the work machine.

4. Method according to claim 2, wherein the load distribution is measured by measuring the load at the front and at the rear of the load carrier.

5. Method according to claim 1, wherein the second tipping pressure is a function of the inclination angle.

6. Method according to claim 1, wherein the second tipping pressure is limited by a third tipping pressure corresponding to a maximum allowed tipping pressure regardless of the inclination angle.

7. Method according to claim 1, wherein the second tipping pressure is displayed on a display in the instrument cluster.

8. Method according to claim 1, wherein the second tipping pressure is stored in a table together with the inclination angle.

9. Method according to claim 1, wherein the predefined inclination angle is less than eight degrees.

10. Method according to any of claim 9, wherein the predefined inclination angle is less than four degrees.

11. A tipping device for a working machine, the working machine comprising a load carrier and at least one lift cylinder adapted to raise the load carrier, wherein the tipping device comprises a means for adjusting the maximal allowed tipping pressure to the lift cylinder based on the inclination of the working machine when the working machine is inclined such that the rear end of the working machine is higher than the front end, wherein the maximal allowed tipping pressure is set to a first tipping pressure when the inclination of the working machine is below a predefined inclination angle, and the maximal allowed tipping pressure is set to a second tipping pressure that is higher than the first tipping pressure when the inclination angle of the working machine is greater than the predefined inclination angle.

12. A tipping device according to claim 11, wherein the means for adjusting the maximal allowed tipping pressure is a variable valve.

13. A tipping device according to claim 11, wherein the second tipping pressure is limited by a third tipping pressure corresponding to a tipping pressure limit.

14. A tipping device according to claim 11, wherein the working machine comprises an electronic inclination sensor that inputs the inclination angle to a control unit.

15. A tipping device according to claim 11, wherein the working machine comprises load sensing means on a front axle and a rear axle adapted to measure the load distribution between the front axle and the rear axle in order to provide a measure for the inclination angle of the work machine.

16. A tipping device according to claim 11, wherein the working machine comprises load sensing means arranged at the front and at the rear of the load carrier adapted to measure the load distribution of the load in order to provide a measure for the inclination angle of the work machine.

17. A tipping device according to claim 14, wherein the control unit adjusts the tipping pressure in dependency of the inclination angle.

18. A tipping device according to claim 11, wherein the work machine comprises an inclinometer connected to a variable pressure valve with a lever, such that the variable pressure valve adjusts the tipping pressure in dependency of the inclinometer.

19. Working machine, comprising a load carrier and at least one lift cylinder adapted to raise the load carrier, and a tipping device, wherein the tipping device comprises a means for adjusting the maximal allowed tipping pressure to the lift cylinder based on the inclination of the working machine when the working machine is inclined such that the rear end of the working machine is higher than the front end, wherein the maximal allowed tipping pressure is set to a first tipping pressure when the inclination of the working machine is below a predefined inclination angle, and the maximal allowed tipping pressure is set to a second tipping pressure that is higher than the first tipping pressure when the inclination angle of the working machine is greater than the predefined inclination angle.

20. A computer comprising program code for performing, when the program is run on the computer, all steps in a method for tipping a load by a working machine, where the working machine comprises a load carrier and at least one lift cylinder adapted to raise the load carrier for tipping the load, the method comprising
obtaining a measure for the inclination angle of the working machine, where the inclination of the working machine is such that the rear end of the working machine is higher than the from end thereof,
allowing a first maximal tipping pressure to the lift cylinder for raising the load carrier when the inclination angle is smaller than a predefined inclination angle, and
allowing a second maximal tipping pressure to the lift cylinder for raising the load carrier when the inclination angle is greater than the predefined inclination angle, the second maximal tipping pressure exceeding the first maximal tipping pressure.

21. A non-transitory computer program product comprising program code means stored on a computer readable medium for performing, when the program product is run on a computer, all steps in a method for tipping a load by a working machine, where the working machine comprises a load carrier and at least one lift cylinder adapted to raise the load carrier for tipping the load, the method comprising
obtaining a measure for the inclination angle of the working machine, where the inclination of the working machine is such that the rear end of the working machine is higher than the front end thereof,
allowing a first maximal tipping pressure to the lift cylinder for raising the load carrier when the inclination angle is smaller than a predefined inclination angle, and
allowing a second maximal tipping pressure to the lift cylinder for raising the load carrier when the inclination angle is greater than the predefined inclination angle, the second maximal tipping pressure exceeding the first maximal tipping pressure.

22. A tipping device for a working machine, the working machine comprising a load carrier and at least one lift cylinder adapted to raise the load carrier, wherein the tipping device comprises a means for adjusting the maximal allowed tipping pressure to the lift cylinder based on the inclination of the working machine when the working machine is inclined such that the rear end of the working machine is higher than the front end, wherein the maximal allowed tipping pressure is a function of the inclination angle.

* * * * *